March 6, 1928.

A. B. ROBINSON

CHECK

Filed Aug. 28, 1922

1,661,961

Patented Mar. 6, 1928.

1,661,961

UNITED STATES PATENT OFFICE.

ALBA B. ROBINSON, OF HERKIMER, NEW YORK.

CHECK.

Application filed August 28, 1922. Serial No. 584,862.

My present invention has reference to an improved check adapted particularly for use in transmitting small amounts in money through the mails, and has for its primary object to provide simple means whereby the use of postage stamps or coins in making small remittances can be avoided.

The drawing illustrates a plan view of a check in accordance with this invention.

My improved check may be issued by a mercantile house, bank or, as a matter of fact, by any firm, and is designed to avoid the necessity of a party using the same visiting the postoffice to obtain a money draft. The check comprises a sheet 1 of a suitable size, the same being provided at its ends with stubs and having a central division line 2 which extends longitudinally the entire length of the check. On the stub 3 at the left hand side of the check above the division line 2 there is imprinted the name of the post office D, at which the check is issued, as well as the words "Money strip" and "Present this stub at any ____ office for redemption", while the lower half of the stub, indicated by the numeral 4 has imprinted thereon "Redemption value indicated at the right". The upper right hand corner of the stub at the opposite end of the check, indicated by the numeral 5 has imprinted thereon the name of the post office at which the check is payable, and below that "Pay to ____" and "Address ____". The lower right hand stub, indicated by the numeral 6, has imprinted thereon the words "Sent by" and spaces for the name of the sender and his address. The body of the check is divided transversely into blocks or spaces 7 respectively, the said spaces being each one hundred in number, and having imprinted thereon consecutively the numerals 0.1¢ to $1.00. These blocks are centrally intersected by the division line 2, which line divides the said blocks into an upper series 8 and into a lower series 9.

In use, we will presume that the issuer desires to send to the party whose name is indicated on the stub 5, say the sum of $.65. He therefore folds the strip on the transverse line of the block having imprinted thereon the numeral 35 in the lower series of blocks 9, as indicated by the arrows A on the figure of the drawing. He mails the right hand half of the torn check to the party to whom the payment is to be made. The face value of the check is $1.00. The receiver of the right hand half of the check presents the same for payment at X post office. The postal agent will readily see by inspecting the upper block at the torn edge of the check that he is to pay out $.65, and by observing the figure in the lower block that $.35 is redeemable to the purchaser and sender of the check. In a like manner, the post office issuing the check will know, by inspecting the blocks at the torn edge of the left hand side of the check that the party to whom it has been issued will note that the sum of $.65 has been paid thereon and that the check is redeemable for $.35. Of course, the issuer of the checks receives a suitable remuneration therefor.

It is, of course, to be understood that the printed matter on the stubs is susceptible to change.

Having described the invention, I claim:

A check having on its face a central dividing line and a stub at each end thereof, the stub at the upper left hand corner of the check having imprinted thereon appropriate indicia designating a post office issuing the check and instructions with respect to its redemption at a second post office, the lower left hand corner having imprinted thereon "Redemption value indicated at the right", the upper right hand corner having imprinted thereon the post office at which the check is to be cashed and instructions as to whom it is payable and having at its lower corner appropriately designated space for the name and address of the sender, the body of the check being divided by transverse lines into one hundred blocks, said check having a central longitudinal line which divides the blocks into an upper and a lower series, said upper and lower series of blocks having imprinted therein the consecutive designations therefor from .01 to $1.00 and the said designations being reversely arranged with respect to the upper and lower series of blocks.

In testimony whereof I affix my signature.

ALBA B. ROBINSON.